Feb. 5, 1946.  I. L. STEPHAN  2,394,496
AIRCRAFT LANDING GEAR
Filed July 17, 1942    2 Sheets-Sheet 1
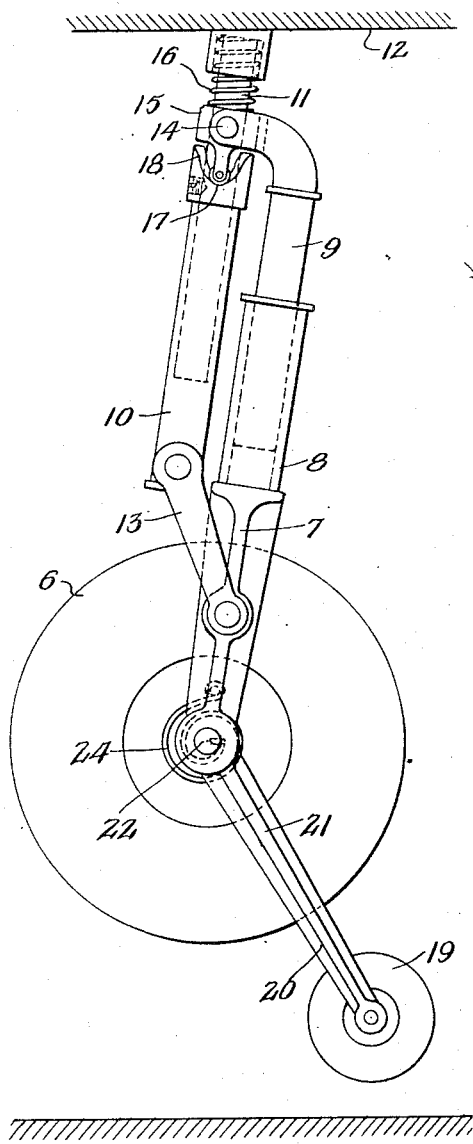
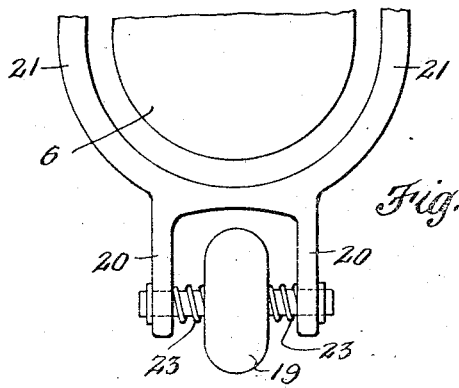
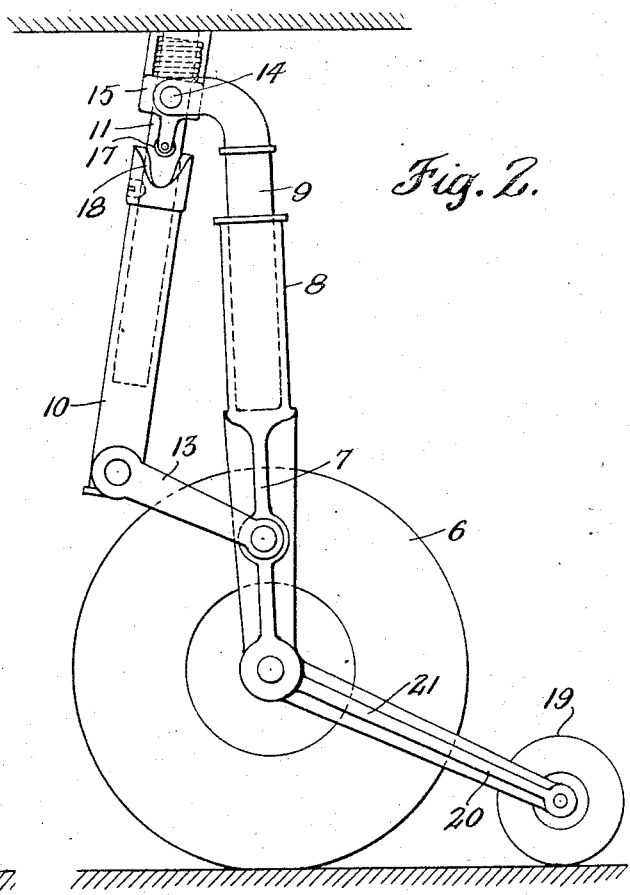
INVENTOR:
Ingo L. Stephan
BY
Synnestvedt & Lechner
ATTORNEYS.

Feb. 5, 1946.   I. L. STEPHAN   2,394,496
AIRCRAFT LANDING GEAR
Filed July 17, 1942   2 Sheets-Sheet 2

INVENTOR:
Ingo L. Stephan
BY
ATTORNEYS.

Patented Feb. 5, 1946

2,394,496

UNITED STATES PATENT OFFICE 2,394,496

AIRCRAFT LANDING GEAR

Ingo L. Stephan, Delanco, N. J.

Application July 17, 1942, Serial No. 451,300

12 Claims. (Cl. 244—102)

This invention relates to aircraft landing gear and especially to landing gear of the type incorporating castering landing wheels.

Various forms of castering landing wheels for aircraft have been proposed heretofore, but so far as I am aware, such wheels have not come into any appreciable commercial use, apparently because of defects or disadvantages in the structure or operation of the arrangements proposed.

The employment of castering landing wheels, however, affords certain basic advantages in the operation of aircraft, both with respect to take-off and with respect to landing. For instance, with castering wheels, landings and take-offs need not be made directly "into the wind," as is customary with aircraft having the standard non-castering landing wheels. Indeed, castering wheels permit landing and take-off with the longitudinal axis of the fuselage positioned at a considerable angle to the direction of movement with respect to the ground.

With the foregoing in mind, the primary object of the present invention is to make it practical to employ castering landing wheels whereby the aircraft is capable of making "angular" take-offs and landings whenever desired. It is contemplated that landings and take-offs may be made over such a wide range of angles as to make possible operation of aircraft from a field or airport having only a single runway.

Certain of the fundamental advantages of the castering type of landing wheel are especially important in heavy aircraft, but heretofore the difficulties encountered with prior arrangements were particularly troublesome where the landing wheels were of relatively great mass, as is required in heavy aircraft. For example, heretofore the shocks resulting from sudden twisting of the castering wheels when making an "angular" landing were so great as to be prohibitive, especially where the landing wheels were of relatively great mass. Moreover, prior arrangements tended to set up "shimmy" and other objectionable oscillations and vibrations of the wheels and their supporting elements.

One important feature of the invention is the provision of a ground contacting steering element employed in association with a castering wheel. This steering element is arranged to engage the ground prior to the wheel when a landing is being made and is further arranged to steer the wheel into alignment with the direction of movement of the aircraft with respect to the ground, regardless of the position of the longitudinal axis of the aircraft, and thus regardless of the wind direction. In this way the castering wheel is steered into proper position for making a landing prior to the time of actual contact of the wheel with the ground, and as a result severe lateral impacts on the landing wheel itself are eliminated, as are also danger of shimmy and unintentional turning moments.

The foregoing feature is of great importance in overcoming difficulties heretofore encountered in the use of castering wheels, especially where the wheels and the parts castering therewith were of relatively great mass.

According to a further feature of the invention, a releasable self-center device is associated with the castering mounting for the landing wheel so that when the wheel is not in contact with the ground it will normally be maintained in alignment fore and aft of the aircraft. Coupled with the provision of this releasable self-centering device I contemplate employing means providing for the release of the device when the steering element for the wheel first contacts the ground, thereby facilitating the automatic steering function which acts to bring the wheel into the proper position for making a landing.

In addition to the foregoing, the invention contemplates a resilient or yielding mounting for the supplemental or steering device for the castering wheel whereby to further absorb shocks, especially lateral shocks when making a landing.

Still another object of the invention is the arrangement of the parts so as to provide for retracting the landing wheels, notwithstanding the castering mountings provided therefor, and notwithstanding the employment of the steering element.

How the foregoing and other objects and advantages are attained will appear to best advantage from a consideration of the following description, referring to the accompanying drawings, in which:

Figure 1 is a side view of an aircraft landing wheel and mounting mechanism therefor, all arranged in accordance with this invention;

Figure 2 is a view similar to Figure 1 but illustrating the parts in a different position;

Figure 3 is a fragmentary view of certain parts, as will appear hereinafter;

Figure 4:
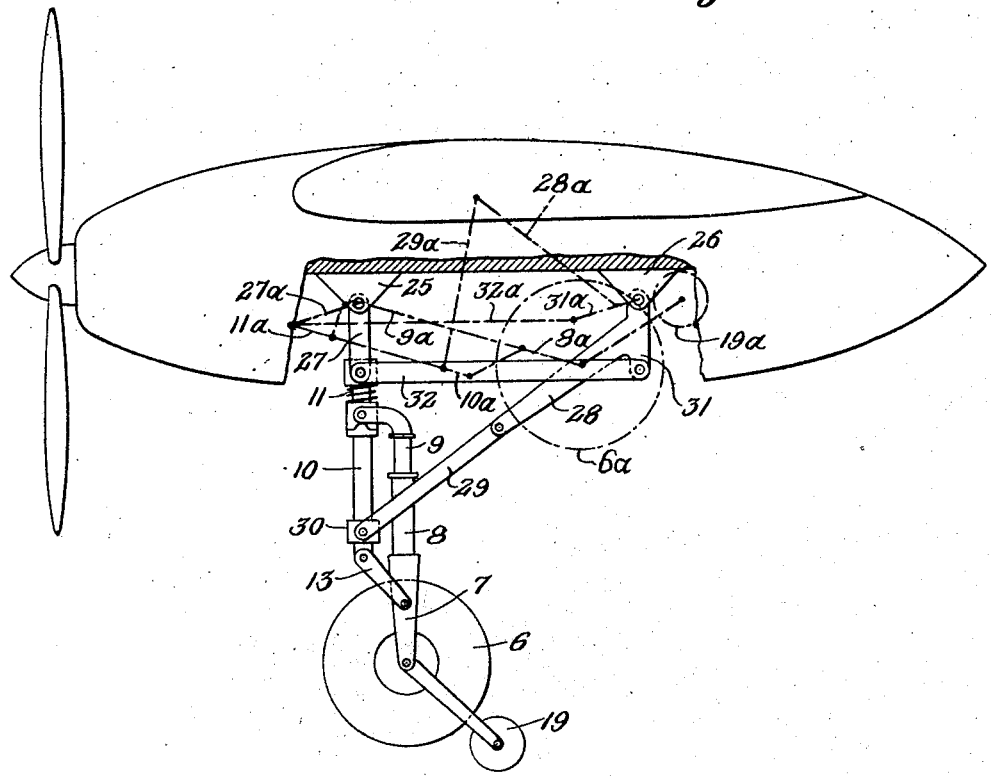
Figure 4 is a somewhat diagrammatic view illustrating a modification of the arrangement adapting it to retracting of the landing wheels.

Although the invention is applicable to any aircraft landing wheel, in the form of Figures 1 to 3 it is assumed that the landing wheel therein illustrated constitutes one of a pair of main landing wheels for a conventional airplane. In this embodiment the arrangement is illustrated as applied to a fixed or "non-retractible" landing gear.

The wheel 6 is mounted in a fork 7 which is carried at the lower end of a shock-absorbing strut comprising outer and inner parts 8 and 9. Telescoped and relatively rotatable members 10 and 11 comprise a supporting strut, the upper end of which is connected with the body of the aircraft indicated diagrammatically at 12, it being understood that this strut would be appropriately connected with primary structural elements of the fuselage. Member 10 is rotatable about the axis of member 11 and the lower end of member 10 is coupled by means of bifurcated link 13 with the fork 7 in which the wheel is mounted. Pivots are provided at both ends of this link. The upper part 9 of the shock strut is pivoted at 14 to a collar 15 which is vertically slidable and rotatable on member 11. A compression spring 16 normally urges collar 15 downwardly so that the rollers 17 (one being provided at each side) bear against the centering notches 18 which are formed on a part secured to the member 10. This arrangement serves as a self-centering device and normally retains the wheel in a plane parallel to the longitudinal axis of the aircraft.

As will be seen from examination of Figure 2, when the shock strut 8—9 moves upwardly under the landing load, the collar 15 also moves upwardly against the spring 16 and thereby separates rollers 17 from the centering notches 18. In this way the self-centering device is "released" and the wheel is then entirely free to caster.

According to this invention, a ground contacting steering element is provided for the castering wheel. While the steering element may comprise a skid, in the embodiments illustrated in the drawings, this element comprises a supplemental or pilot wheel 19, preferably pneumatic. The wheel is mounted between one pair of prongs 20—20 (see Figure 3) of a double forked member, the other prongs 21—21 of which embrace the wheel 6, having their inner ends pivoted to the wheel mounting yoke 7, desirably about the axis 22. This mounting provides freedom for swinging movement of the wheel 19 upwardly and downwardly, the range of movement extending below the wheel 6 so that wheel 19 will contact the ground prior to the main wheel when a landing is being made. Preferably an abutment or stop is arranged to arrest downward movement at about the position indicated in Figure 1.

Examination of Figure 1 will show that wheel 19 is disposed well to the rear of the castering axis provided by the strut members 10 and 11. Because of the rearward offset of wheel 19 from the castering axis, when the aircraft "comes in" to a landing, the initial contact of wheel 19 with the ground serves to steer the main wheel 6 into alignment with the direction of movement of the aircraft over the surface of the ground. Therefore, as the aircraft settles, the main landing wheel 6 is brought to the proper running position, regardless of angularity between the longitudinal axis of the aircraft and the actual direction of movement with respect to the ground.

As the landing is being made, wheel 19 swings upwardly as indicated in Figure 2, which figure illustrates the parts in the positions occupied under landing load (ignoring, however, compression of the rubber or pneumatic tire ordinarily used).

An important advantage of the arrangement described above is that employment of the supplemental steering wheel makes it practical to bring the castering axis to a position very close to or even substantially on the center of gravity of the main landing wheel. In this way the moment of inertia during castering of the main wheel is reduced to a minimum.

It is further noted that the movement of the wheel supporting struts brings the main wheel considerably to the rear of the castering axis when under load, so that the castering effect of the main wheel is more pronounced when the aircraft is on the ground, as in taxiing or taking off.

As mentioned above, the functioning just described may be secured by the employment of a steering element other than a wheel, for instance by a skid, but I believe the wheel arrangement is preferable, at least for relatively heavy aircraft.

The pilot or steering wheel or element is desirably of relatively small mass, in order to avoid undesirable inertia effects. No difficulty is encountered in utilizing lightweight parts for this purpose, since the pilot element serves only a steering function and need not be relied upon to carry any appreciable amount of the total landing load, and further since the location of the castering axis close to the center of gravity of the main wheel reduces the moment of inertia.

In the preferred construction provision is made for some relative lateral movement between the steering element or wheel and the main landing wheel 6, i. e., movement of the ground contacting steering element in a lateral direction or generally about the castering axis, so as to absorb lateral shocks. Thus, as shown in Figure 3, the wheel 19 may have freedom for lateral movement between prongs 20—20 of the mounting fork. Yielding centering means such as compression springs 23 will serve to normally maintain wheel 19 in the mid position.

While the weight of the mounting parts and of wheel 19 itself may be relied upon to provide sufficient ground contacting force to accomplish the steering, a spring 24 is shown in Figure 1 reacting between the mounting fork for the wheel and the yoke 7 in order to urge the wheel 19 downwardly.

Moreover, the reaction of such a spring (24), or of any other suitable device such as a dashpot, may be relied upon to oppose or damp upward movement of wheel 19. This is of importance since it is contemplated that the weight of various parts and the reaction of spring 24 (or of other suitable means) shall be such that upon initial contact of wheel 19 with the ground the upward force transmitted to the yoke 7 and thus to the shock strut 8—9 shall be sufficient to compress spring 16 and thus release the self centering device. Thereby the main wheel is released for free castering immediately upon initial contact of the supplemental wheel with the ground. Thus these parts are arranged to provide for free castering of the main wheel 6 prior to the time it contacts the ground.

Figure 5:
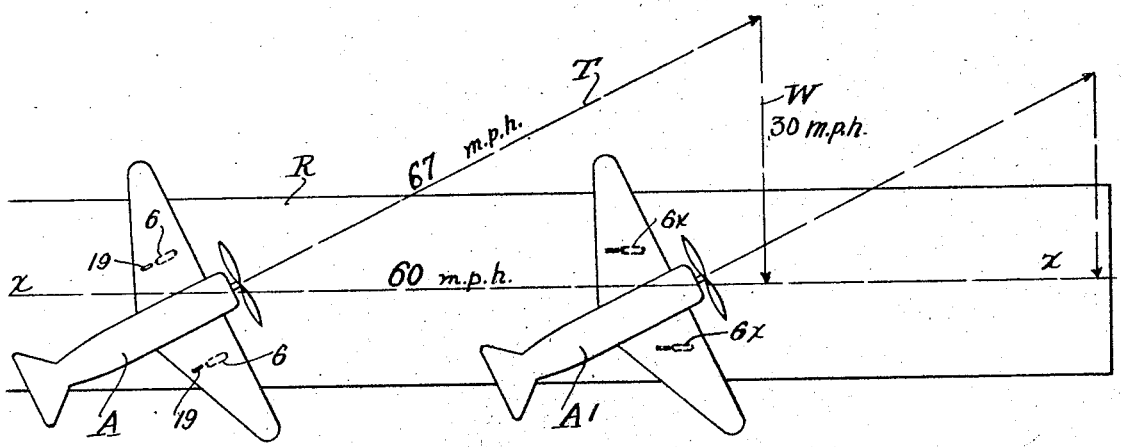
Figure 5 is a diagram illustrating the manner of making a landing, as provided for in accordance with the invention.

Before analyzing the operation in connection with the diagram of Figure 5, brief reference is here made to the modification illustrated in Figure 4. As there shown, the landing wheel is mounted by means of retracting mechanism, in association with an outboard engine nacelle. Certain of the parts employed for retracting the wheel are similar to a known arrangement, although other parts have been modified in adapting the mechanism to the retracting of a landing wheel arrangement of the type contemplated by the present invention.

The major elements of the wheel arrangement and the supporting structure are identified in Figure 4 by the same reference characters as used in Figures 1 to 3. In considering the links, levers, etc. incorporated in the retracting mechanism, it should also be kept in mind that the showing in Figure 4 is somewhat diagrammatic and that various of the parts illustrated are actually employed in pairs or are offset from the mean plane of the shock and supporting struts for the wheel, in order to provide proper clearances.

The retracting mechanism is mounted on two or more fixed brackets such as shown at 25 and 26 arranged within the engine nacelle. A pivoted link 27 interconnects support 25 and the upper end of the strut member 11. A bell crank lever is pivoted to fixed part 26, one arm 28 of this bell crank being interconnected, by means of link 29, with a collar 30 which is rotatively mounted on strut member 10, so as not to interfere with the castering action of the wheel. The other arm 31 of the bell crank just mentioned is linked to the strut member 11 by means of link element 32. With this arrangement, compound movements of the links and levers take place when the landing gear is retracted, the parts just described taking the positions indicated in dot and dash lines. The same reference characters are applied to these dot and dash lines, each character being followed by the letter $a$ to indicate the folded or retracted position.

Thus, when the landing gear is retracted, the main wheel moves upwardly to the position indicated at 6a, in which it is in large part enclosed within the outline of the nacelle, the pilot wheel 19 being located as indicated at 19a.

In connection with Figure 4, it may be mentioned that by appropriate spacing of pairs of members 28 and 29 at opposite sides of the shock strut 8—9, and by the employment of a rotating collar 30 on the strut member 10, the retracting mechanism will not interfere with the desired castering action of the wheel.

Turning now to Figure 5, A indicates an airplane approaching to a landing on runway R. It is here assumed that there is a 30 M. P. H. crosswind as indicated at W and that the airspeed of the airplane is 67 M. P. H. in the direction indicated by the line T. Under these conditions, the direction of travel of the aircraft with respect to the ground is indicated by the line X—X, and the ground speed is 60 M. P. H. Obviously, if non-castering landing wheels were to contact the runway in the attitude indicated by the aircraft at A, overturning and other undesirable forces would be set up. However, with the arrangement of the present invention, as soon as the steering elements for the landing wheels contact the ground, for instance when the airplane reaches the position indicated at A—1 in Figure 5, the main landing wheels 6 are brought to a position of parallelism with the actual direction of movement of the airplane with respect to the ground. This is indicated by the position of the wheels at 6x.

Since the arrangement of the present invention provides for steering of the main landing wheels into the desired position prior to actual contact of the main wheels with the ground, shocks, turning moments, shimmy, and the like, are eliminated.

A similar action may be relied upon for purposes of effecting take-off, in which event, instead of taking off with the longitudinal axis of the aircraft paralleling the wind direction, the position of the body may be angled, for example, in the manner illustrated in Figure 5.

With freedom for castering action up to about 45° to either side of the mid (fore and aft) position of the wheels, take-offs and landings may be effected with only a single runway, regardless of the direction of the wind.

I claim:

1. In an aircraft, a castering landing wheel, a ground contacting steering element for the wheel, said element being mounted to move with the wheel during castering movement thereof and further being movable vertically with respect to the wheel, and yielding means providing limited relative motion between the castering wheel and the steering element in a direction generally about the castering axis, a lower position of said element providing for contact with the ground at a point to the rear of the castering axis prior to contact of the castering wheel when the aircraft is making a landing.

2. In an aircraft, a landing wheel mounted for shock absorption movement and for castering movement, a ground contacting steering element for the wheel, said element being mounted to move with the wheel during castering and shock absorption movement thereof and further being movable vertically with respect to the wheel, a lower position of said element with respect to the wheel providing for contact with the ground at a point to the rear of the castering axis prior to contact of the castering wheel when the aircraft is making a landing, a self-centering device for the castering wheel providing for alignment of the wheel longitudinally of the aircraft when the wheel is out of contact with the ground, and means operative upon upward movement of said steering element to release said self-centering device, whereby said device is released during the making of a landing.

3. In an aircraft, a landing wheel mounted for castering movement, a releasable self-centering device for urging said wheel, on its castering mounting, to a position in alignment with the longitudinal axis of the aircraft, a ground contacting steering element for the wheel mounted for movement therewith about the castering axis, means mounting said element for movement in a generally vertical direction with respect to the wheel through a range extending below the wheel whereby said element will contact the ground prior to contact of the castering wheel when the aircraft is making a landing, and means providing for release of said self-centering device by virtue of upward movement of said steering element with respect to said wheel.

4. A construction in accordance with claim 3 in which said means for releasing the self centering device is effective to release the self centering device upon initial upward movement of the steering element from its lower position.

5. In an aircraft, a landing wheel, a pair of generally upright struts for supporting the wheel, the wheel being mounted on one of said struts and the other being connected with the body of the aircraft, a link pivotally interconnecting lower portions of said two struts, pivot means interconnecting upper portions of said struts, the strut connected with the body of the aircraft incorporating means providing for castering of the other strut and of the wheel therewith, a releasable self centering device for maintaining the wheel in alignment with the longitudinal axis of the aircraft, said self centering device being arranged to release upon relative upward movement of the strut on which the wheel is mounted, a ground contacting steering element for the wheel projecting rearwardly and downwardly therefrom and movable vertically with respect to the wheel through a range extending below the wheel whereby said element will contact the ground prior to contact of the wheel, and yielding means reacting between said element and the strut on which the wheel is mounted for resisting upward movement of the steering element, the resistance force of said yielding means being such that upon contact with the ground when making a landing, the wheel strut is raised to release the self centering device prior to contact of the landing wheel with the ground.

6. In an aircraft, a landing wheel, a pair of generally upright struts for supporting the wheel, one of said struts incorporating shock absorption means and the other incorporating swiveling means providing for castering of the wheel, the wheel being mounted on one of said struts and the other being connected on the body of the aircraft, a link pivotally interconnecting lower portions of said two struts, pivot means interconnecting upper portions of said struts, a releasable self-centering device associated with the swiveling strut, and means operative upon compression of the shock absorption strut to release the self-centering device.

7. In an aircraft, a landing wheel, a pair of generally upright struts for supporting the wheel, one of said struts incorporating shock absorption means and the other incorporating swiveling means, the wheel being mounted on the shock absorption strut and the swiveling strut being connected with the body of the aircraft, means mounting the shock absorption strut on said swiveling strut to provide freedom for movement of the wheel and of the shock absorption strut in the castering sense, and mechanism for retracting the wheel and said struts including a pivotal mounting for the swivel strut, a link for pivoting the swivel strut between the retracted and the extended positions, and a rotative connection between said link and the swivel strut permitting free castering action of the wheel in extended position.

8. In an aircraft, a landing wheel mounted for shock absorption movement and for castering movement, means providing for shifting of the position of the wheel with respect to the castering axis in a rearward direction with respect to said axis upon shock absorption movement of the wheel during landing, and a ground contacting steering element for the wheel mounted to move with the wheel during castering movement thereof and further being movable vertically with respect to the wheel, a lower position of said element providing for contact with the ground at a point to the rear of the castering axis prior to contact of the castering wheel when the aircraft is making a landing.

9. In an aircraft, a pair of primary landing wheels each mounted for independent castering movement, a ground contacting steering element for each wheel, said element being mounted to move with the wheel during castering movement thereof and further being movable in a vertical arc substantially concentric with the wheel, a lower position of said element providing for contact with the ground at a point to the rear of the castering axis prior to contact of the castering wheel when the aircraft is making a landing, and, for each wheel, a yielding self-centering device operative independently of the device for the other wheel to urge the associated wheel into alignment with the longitudinal axis of the aircraft.

10. In an aircraft, a pair of primary landing wheels each mounted for independent castering movement, a ground contacting steering element for each wheel, said element being mounted to move with the wheel during castering movement thereof and further being movable vertically with respect to the wheel, for each wheel a self-centering device operative independently of the device for the other wheel to center the associated wheel about its castering axis in a position in which the wheel parallels the longitudinal axis of the aircraft, a lower position of such steering element providing for contact with the ground at a point to the rear of the castering axis prior to contact of the castering wheel when the aircraft is making a landing, and, for each self-centering device, means for releasing it upon contact of the steering element with the ground.

11. In an aircraft, a pair of primary landing wheels positioned to take the major portion of the landing load, a shock strut for each wheel providing for castering movement of each wheel upon a rotational axis behind a generally upright swiveling axis, a centering device for each wheel adapted to maintain its associated wheel in alignment with the longitudinal axis of the aircraft, and ground contacting means positioned to establish ground contact prior to the landing wheels when making a landing, said means being operative upon making ground contact to release the centering devices and to permit the landing wheels to assume positions at an angle to the longitudinal axis of the aircraft during landing.

12. In an aircraft having landing gear including at least two primary landing wheels, one located toward each side of the craft, each of said wheels being mounted for directional movement and adapted to bear a major portion of the landing load, the combination of means for preventing directional movement of said wheels during flight comprising a releasable centering device for each wheel; and means providing for directional movement of each wheel individually on landing, comprising: a support for each wheel having an upright swiveling axis, and a steering device for each wheel operating through the wheel support to release its associated centering device before the wheel is subjected to major landing load and to impart directional movement to the wheel about said swiveling axis, said swiveling axis being closely adjacent the center of gravity of the wheel at least prior to taking its burden of the landing load whereby initial steering of the wheel by said steering device is effected by a swivelling movement of the wheel about said swivelling axis close to its center of gravity without substantial angular displacement of the center of gravity of the wheel about said swivelling axis, thereby providing for effective steering of the wheel upon application of relatively small steering forces.

INGO L. STEPHAN.